United States Patent [19]

Andre´ et al.

[11] 4,101,084

[45] Jul. 18, 1978

[54] WORK-POST CONSOLE FOR SEMI AUTOMATIC MACHINES

[75] Inventors: Pierre André; Robert Caretti; Michel Depoutot; Gérard Mercet, all of Pontarlier, France

[73] Assignee: Compagnie Industrielle des Telecommunications Cit-Alcatel, Paris, France

[21] Appl. No.: 794,191

[22] Filed: May 5, 1977

[30] Foreign Application Priority Data

May 31, 1976 [FR] France .................................. 76 16381

[51] Int. Cl.² .................... H01F 41/02; B65H 54/02; B65H 54/72
[52] U.S. Cl. ................................. 242/7.11; 181/200; 312/196
[58] Field of Search ................ 312/208, 196; 181/200, 181/201, 202, 203, 204, 206; 242/7.11, 7.09, 1, 25, 79

[56] References Cited

U.S. PATENT DOCUMENTS

| 2,970,874 | 2/1961 | Honeycutt et al. ............. 312/196 X |
| 3,652,143 | 3/1972 | Wener ................................. 312/208 |
| 3,918,650 | 11/1975 | Kemel ............................. 242/25 R |
| 3,951,228 | 4/1976 | Schnill ............................... 181/200 |

Primary Examiner—Billy S. Taylor
Attorney, Agent, or Firm—Sughrue, Rothwell, Mion, Zinn and Macpeak

[57] ABSTRACT

Semi automatic machines such as relay coil winders are mounted in cabins arranged in a semi circle around an operator position. Each machine is normally closed inside its cabin during automatic operation, but is caused to leave its cabin and move towards the operator when it needs manual attention. Particularly applicable to noisy machines which need intermittent manual attention since the cabins provide soundproofing during operation.

17 Claims, 12 Drawing Figures

WORK-POST CONSOLE FOR SEMI AUTOMATIC MACHINES

FIELD OF THE INVENTION

This invention relates to a work-post console for semiautomatic machines, in particular for electromagnetic relay coil winders.

BACKGROUND OF THE INVENTION

Relay coils are wound on their cores by semiautomatic machines which include a part that rotates at high speed (for example, 12,000 r.p.m.). One person feeds and serves the machines at one work-post, said person also positioning the ends of coil wires in coil circuit terminal tags, to which they are subsequently soldered.

U.S. Pat. No. 3,866,314 discloses a work-post equipped with three presses grouped around an operator enabling him to perform three different operations on a work-piece. The arrangement of this work-post nonetheless causes the person who supplies work pieces to move in a cramped manner.

Further, a grouping of several such machines in operation, generates a particularly noisy environment, thereby creating quite stressful working conditions for the operators serving them. The fact that these machines must be constantly accessible for the mounting of cores and removal of completed coils has so far discouraged any attempt at noise abatement.

SUMMARY OF THE INVENTION

Preferred embodiments of the present invention provide a work-post equipped with machines that can be inserted in and removed from cabins, thereby affording direct manual access to the machines at any time, and in particular for the mounting of bare cores on winder spindles.

The present invention provides a work-post for semiautomatic machines comprising several cabins accomodating said machines, said work-post including means for the movement and guidance of the machines when they are advanced out of their cabins and returned to them, with means for opening and closing the cabins as the machines are respectively advanced and retracted, means indicating that machines have completed their tasks, and means for control of the motion of said machines in and out of their cabins.

A preferred feature for the invention is a number of noise damping cabins arranged in a segment of a circle at breastheight with respect to a seated operator, the vertical sides of said cabins being equipped at the concave side of the segment with a double door per cabin, the same sides being equipped with a single-leaf door per cabin at the convex side of the segment, each said cabin being able to contain a coil winding machine.

A further preferred feature for the invention is the extension of the cabin floors towards the seated operator in the form of horizontal panels, each equipped on its edge facing the operator with a push-button controlling motion out from and into the cabin of a winding machine, and a lamp announcing completion of coil winding by that machine.

Another preferred feature is the provision for each winding machine of combined supporting and shifting devices, each comprising an air cylinder and piston, the cylinder being fixed to the frame of a cabin and the piston being fixed to the base of that cabin's machine, said base containing a chamber forming air-cushions facing the floor of the cabin, air expelled from said air cylinder by said piston being piped into said chamber.

A desirable feature for the invention is the provision of machine movement guides, namely a pair of rollers per machine, running in slots provided in the extended floors of the cabins.

Another desirable feature for the invention, is that the long sides of machine bases are equipped with a rail each, lying parallel to the side and both pushing and holding the double doors open, each time the machine is advanced out of the cabin.

A further desirable feature for the invention, is the equipping of each double door leaf with spring-rotated hinges so fitted that each door closes automatically as the machine is returned to its cabin.

Yet another desirable feature for the invention, is the control of machine exit and re-entry by means of an electronic control distribution circuit associated with an electromechanical coil completion indicator and machine moving drive circuit, in such an arrangement that pressing the movement control button pertaining to a machine indicated as having completed coil winding, will bring that machine out of its cabin, while returning another with a coil core mounted and ready for winding.

Further features and advantages of the invention will be shown by way of example in the following description of a nonrestrictive embodiment of a work-post according to the invention and with reference to the accompanying drawings.

DESCRIPTION OF THE PREFERRED EMBODIMENTS

Figure 1:
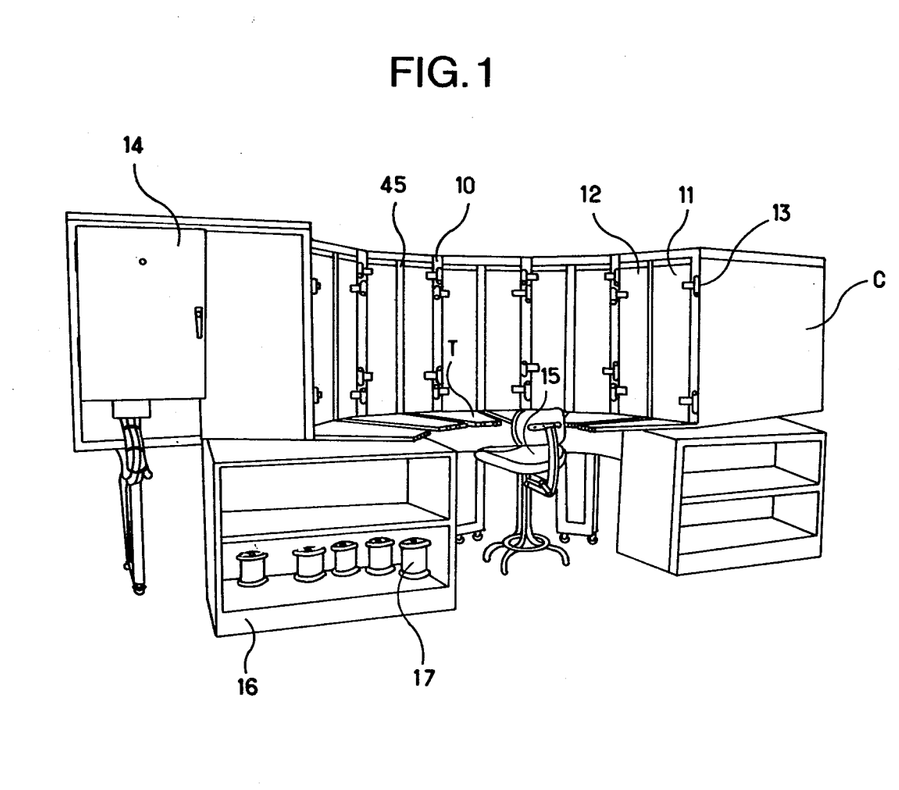
FIG. 1, is a perspective view of a work-post according to the invention, with the operator absent and coil winding machines all in their sound-proofed cabins.

The work-post represented in FIG. 1 has a plurality of cabinets C arranged in a semi-circle. Each cabinet has a double door 11, 12 opening outwards, the leaves of said double doors being mounted on hinges 13 with automatic reclosing springs, said hinges being fixed on uprights 10. A cabinet 14 contains the electrical and electronic circuits of the work-post. The cabin floors are extended to form supporting tablets T converging towards a pivotable chair 15 and supporting the machines when advanced out of the cabins. The work-post is flanked by two shelf-cases 16, in which wire spools 17 and boxes of relay coil cores (not shown in the figure) are stored.

Figure 2:
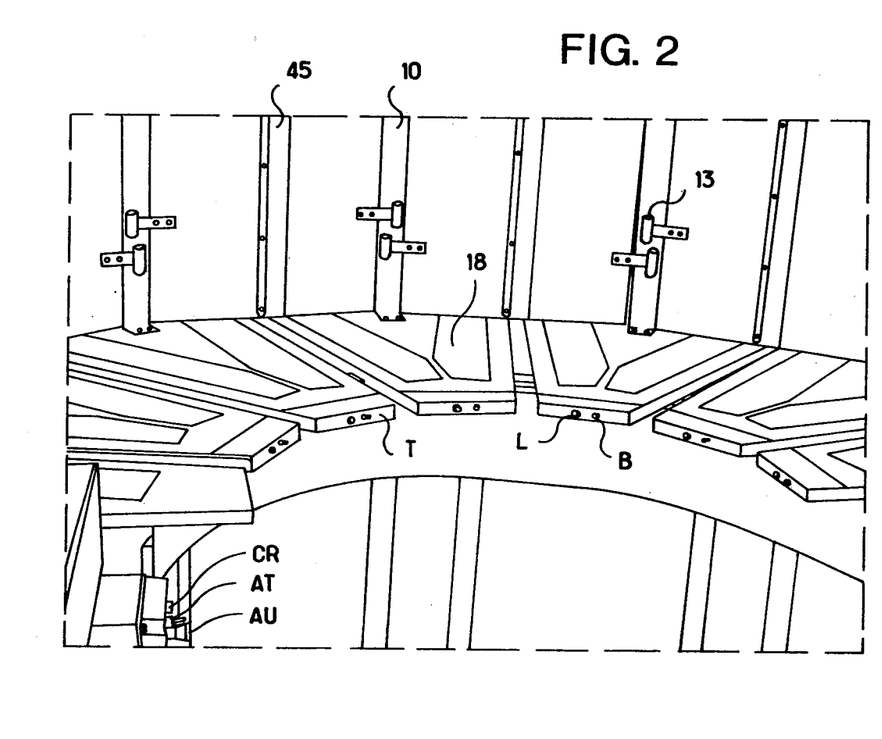
FIG. 2, is a close view of part of FIG. 1 showing the lower parts of double doors and extensions of cabin floors.

The supporting tablets T are shown in closer detail in FIG. 2. Each tablet has a front edge on which there are mounted a push-button B controlling winding machine movement and a lamp L indicating coil completion. Each tablet carries a pair of metal plates 18 parallel to its outer edges and extending into the corresponding cabin. On the left of FIG. 2 a control box is shown having three push buttons: a push-button AU, for emergency stopping of operations; a selection button AT, for selection of programmed advance of one machine with simultaneous withdrawal of another, or single movement of advance per selected machine, and finally another push-button CR for machine withdrawal.

Figure 3:
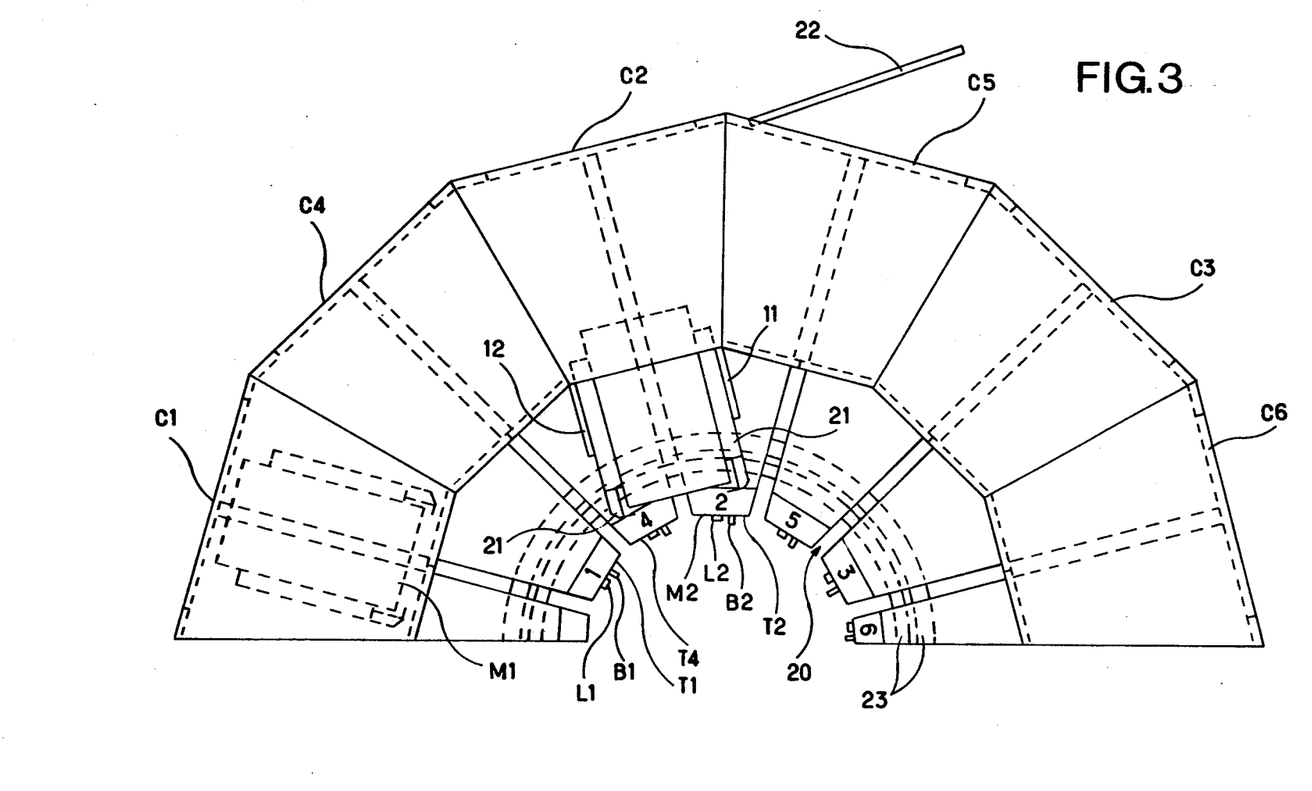
FIG. 3, is a plan view of the work-post.

The tablets are separated by guide-slots 20 which radiate from the arc of front edges towards front-center of each cabin and which extend through each cabin as shown in FIG. 3, thereby dividing its floor into two parts. These slots are used to guide the machine in movement, and are described further on.

The work-post thus has six winding machine cabins C1 to C6, and six coil winding machines, of which only two, M1 and M2, are represented in FIG. 3.

Each machine is frontally and laterally protected by a pair of rails 21, which when the machine moves forward push open the cabin double door 11, 12. At the rear, each cabin has a single leaf door 22 with a lock.

In each cabin the winding machine rests on the two parts of the cabin floor, and when moved, travels on the two adjacent halves of two consecutive tablets: thus, machine M2 shown in the advanced position is astride the slot between tablets T2 and T4 and is supported by the adjacent halves of these two tablets. Machine M2 is brought out of its cabin by pressing button B2, when lamp L2 has lit to announce that M2 has completed a coil.

The entry of machine M1 into its cabin C1 to start winding a coil is simultaneous with egress of machine M2, a relay coil core having evidently been mounted previously on M1.

The supporting tablets are supported in turn and held in position by metal bands 23, fixed to their lower bases.

Collisions between machines are prevented by systematically providing one cabin-space between a machine coming out and a machine going in: the machines and their cabins are therefore numbered in the following order, given as an example: 1, 4, 2, 5, 3, 6.

Figure 4:
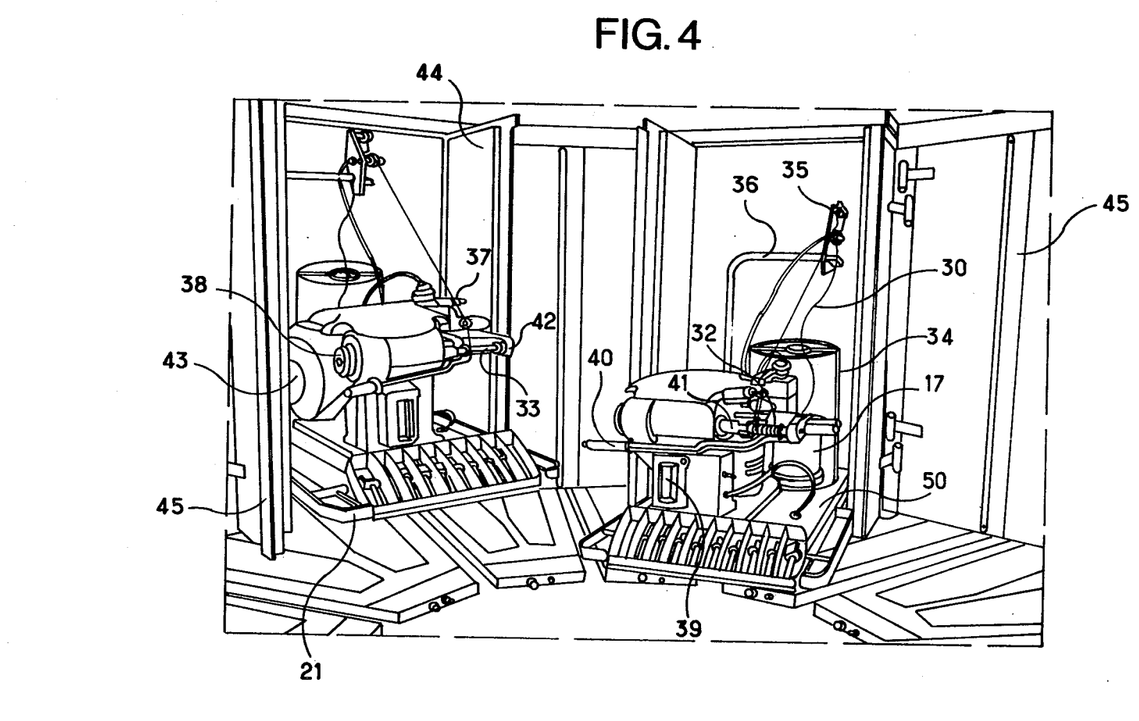
FIG. 4, is a perspective view showing on the left, a machine which is loaded with a coil core and is withdrawn into its cabin and, on the right, a machine which has a completed coil and which project forward, out of its cabin.

FIG. 4 shows two coil winders of known type. The machine on the right is shown coming out of its cabin after having wound copper wire 30 from a spool 17 to form the coil 32 of a relay. The machine on the left is shown retiring into its cabin, with a relay coil core 33 fitted ready for winding.

A transparent cylindrical casing 34 has a pay-out ring limiting the volume of space required for unhindered passage of the wire leaving spool 17. The copper wire leaving the spool 17 is led through a tensioning device 35 on an arm 36 and a tensioning clamp 37, after which it is manually hooked around one of its terminals on the relay core, then given a few turns around the core by rotating a wheel 38.

When the coil 32 has been wound to the required number of turns indicated by a counter register 39, the operator advances the machine, releases the coil by pulling a lever 40, cuts the wire and hooks its loose end around its other terminal on the core. A fresh core is then fitted between spindle 41 and tail-stock 42 for production of a further coil. When another machine is indicated as having completed a coil, the operator presses the control button for that machine, which will then advance out of its cabin, and the previously loaded machine will simultaneously withdraw into its cabin.

The electric motor 43 of a machine is automatically started by a trip operated on complete withdrawal of a machine into its cabin, and closing of the double door. Core 33 starts rotating, and when the control counter has counted down to zero from the set number of turns, it cuts off motor-drive power, applies the motor brake, and lights a lamp to announce coil completion.

Linings 44 on the inner sides of the cabin doors dampen the noise generated by the winding machine motors in operation. One leaf of each double door has a strip of flexible material 45 fixed to its free vertical edge and overlapping the edge of the other leaf, thereby covering the narrow space between the two leaves when the door is closed. To ensure proper closing of the double doors, the head of the rail 21 facing the leaf carrying the strip of flexible material (which may be of foam rubber, for example) extends somewhat further ahead of the machine then the head of the rail on the other side. This ensures that said leaf with the flexible strip will close onto the other. For complete opening of double doors when pushed outwards by the two rails, hinges 13 are fitted to the uprights 10 at a small distance from the edges of the upright, for example as shown in FIG. 2.

Figure 5:
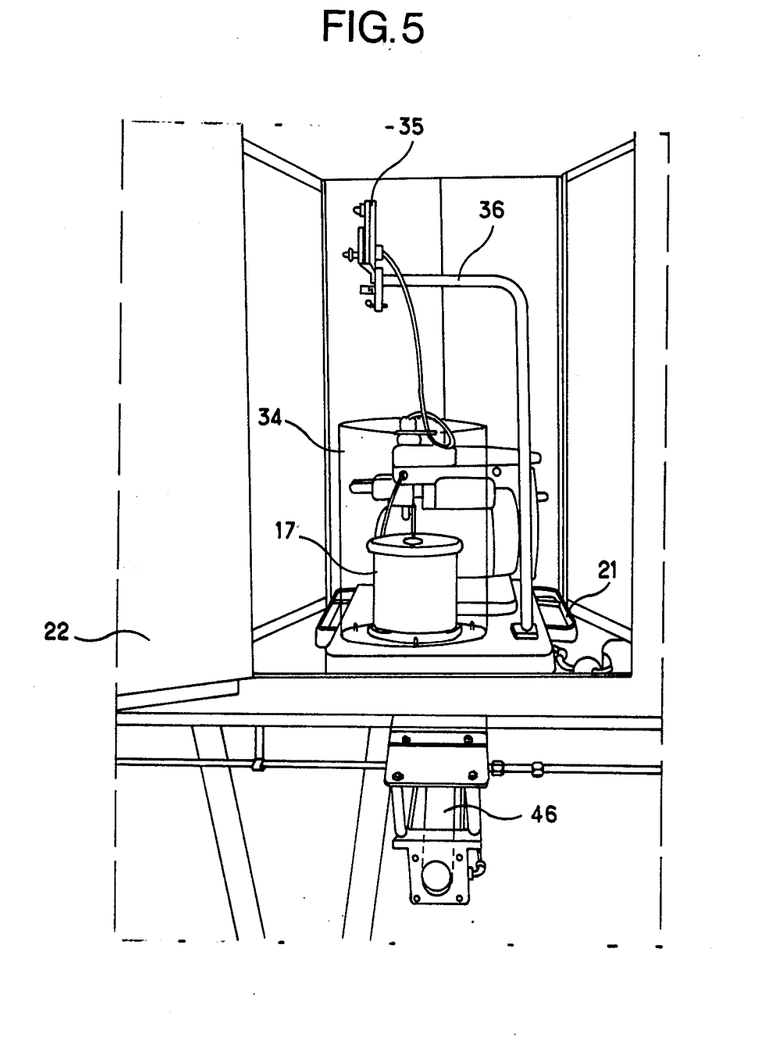
FIG. 5, shows a cabin seen from the rear with its door open, to show a winding machine with its spool of wire.

FIG. 5 shows a winding machine in its cabin, with the rear single-leaf door 22 open, and seen from the outside of the working post. An air-cylinder 46 with which the machine is advanced and withdrawn is also shown.

Figure 6:
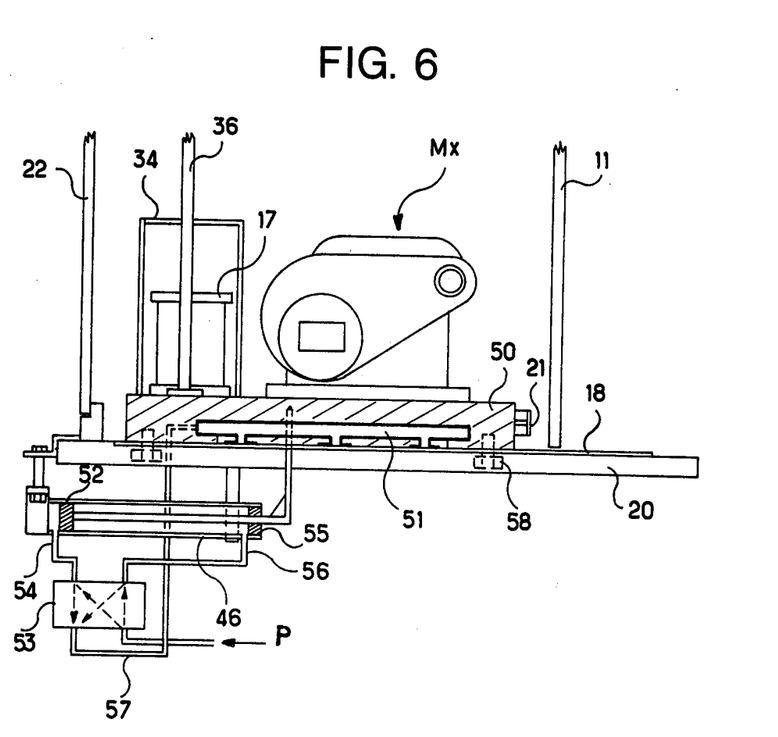
FIGS. 6 and 7, are radial and circumferential views in partial section of the suspension, motion and guidance devices of a winding machine.
Figure 7:
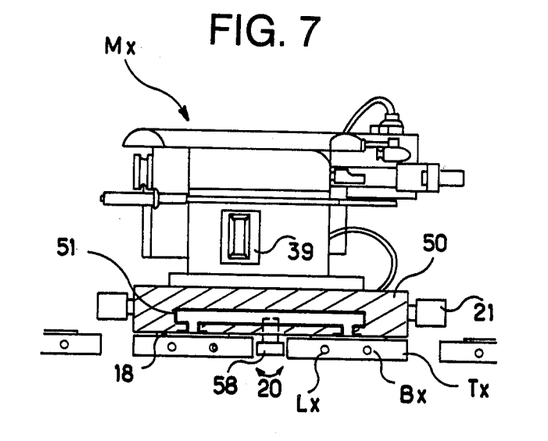

FIG. 6 illustrates the principle employed in providing aircushion suspension for a machine, in coordination with its movement: Base 50 of the winding machine, shown in crosssection, comprises an air-cushion chamber, of which the cushions are flush with the underside of the base and consequently with the upper face of plates 18 fixed to the cabin floors and tablet-forming extensions, on either side of guide slot 20. Cylinder 46 is fixed to the floor of the cabin, and the rod of piston 52 is fixed to the base of the machine. When a lamp L$x$ fitted on the front edge of tablet T$x$ announces coil completion by the machine M$x$ by being lit, the operator presses the control button B$x$ (FIG. 7): this actuates an electrovalve 53 to direct compressed-air P into a feed pipe 54. A piston 52 is thus thrust in the direction of cylinder end 55, thereby driving the air in the cylinder out through a pipe 56, through the electro-valve 53 and a pipe 57 into the air-cushion chamber 51.

After removing the completed coil from machine M$x$ and mounting a fresh core in its place, the operator presses the movement control button B$z$ of a machine M$z$, of which the lamp L$z$ announces coil completion. Pressing B$z$ brings machine M$z$ out of its cabin as described in respect of machine M$x$, while switching the electro-valve serving machine M$x$ to direct air-pressure P into pipe 56, so that machine M$x$ will be drawn back into its cabin, as M$z$ advances.

Each machine is guided in movement by two horizontally placed rollers of which the vertical shafts are fixed to base 50, said rollers running along the vertical edges of guide slots 20.

It is evidently possible, without affecting the use of the work-post embodying to the invention, to replace the air cushion suspensions by more conventional suspensions of the roller type, in which case the base of each machine would be equipped with rubber padded rollers running in guide rails fixed to the cabin floors and their extension tablets. The guide slots 20 are then no longer required, so that the tablets become a single platform of substantially the same shape as the aggregate of the tablets described, the areas per cabin being for example marked off by painted lines in the positions at present occupied by the slots.

Figure 8:
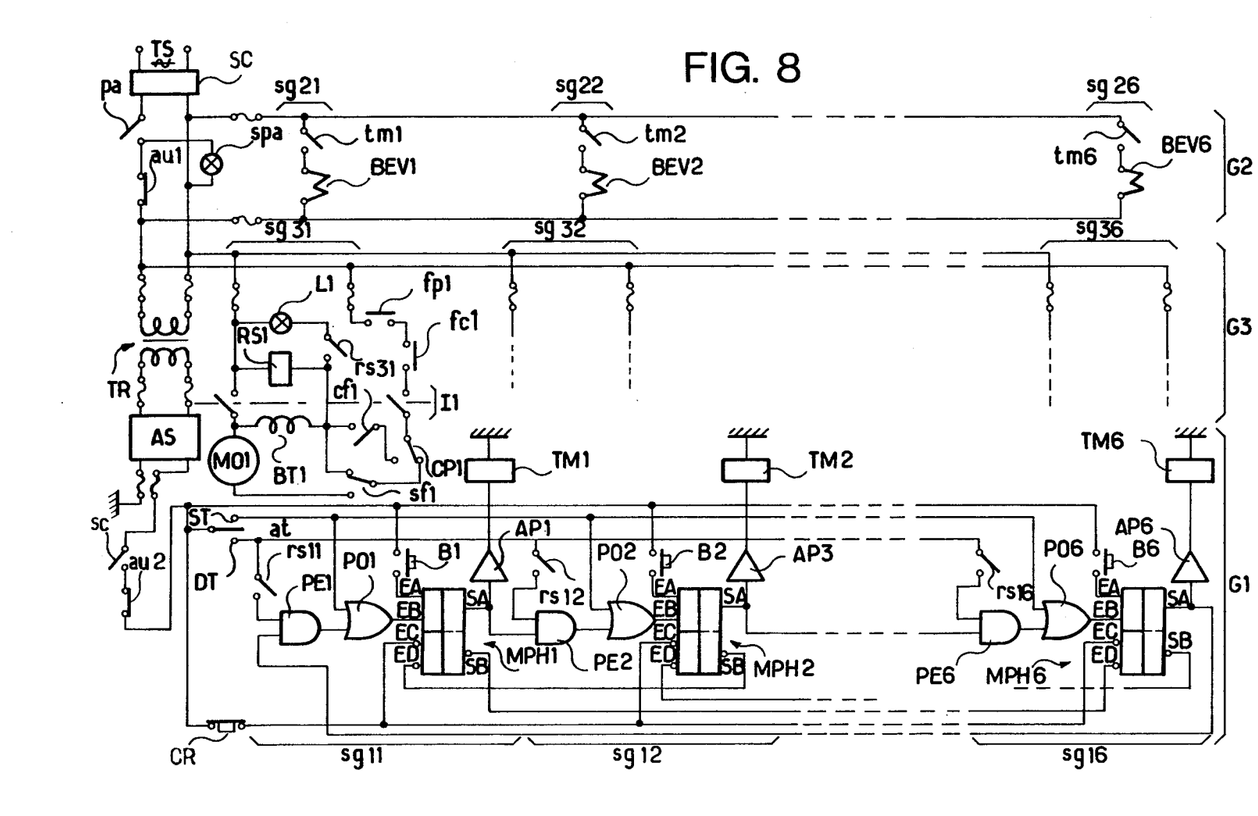
FIG. 8, is a diagram of the electromechanical and electronic circuits of the work-post.

FIG. 8 shows the winding control and indicating circuits, and the machine movement control circuits. A.C. from a mains supply TS is distributed to the electro-mechanical circuits through a main-switch sc. Input voltage is stepped down by a transformer TR, and rectified by a stabilized power supply AS before feeding the electronic control distribution circuits for machine movement. Items such as fs are fuses protecting the circuits.

Main-switch sc controls both general supply and supply of the logic circuits (across contact sc).

Contact pa of a monostat not shown in the figure closes the primary circuit of transformer TR when the compressed air is applied at electrovalve inputs, lamp spa indicating that voltage is applied to the electrical switchgear. Contact au1 operated by emergency stop button AU opens the general supply circuit of the work-post when button AU is pressed. A further contact au2 of AU cuts off the stabilized power supply of the logic circuits.

A group of electronic circuits G1 is connected across the stabilized power supply AS, and two groups of electromechanical circuits G2 and G3, are connected in parallel to the mains input.

Each of said groups includes sub-groups, allocated to winding machines on the basis of one sub-group per machine, the circuits in each sub-group being identical. Thus, the circuits serving coil winding machine number 1 (M1) are composed of sub-groups $sg11$, $sg21$, and $sg31$, those serving machine number 2, (M2) are composed of sub-groups $sg12$, $sg22$, $sg32$, and so forth, in groups G1, G2, and G3.

The electronic circuits in sub-group $sg11$ serving machine M1 comprise, in series, a two-input AND gate PE1, a two-input OR gate PO1, and storage MPH1, provided to record exit of the machine M1. Said storage MPH1 is composed of a flip-flop with outputs SA and SB, an AND gate with inputs EA and EB, and an OR gate, with inputs EC and ED, said gate outputs driving the flip-flop through connections that are not shown. An input of gate PE1 is connected to a contact $rs11$ of the coil completion announcing relay RS1, in circuit sub-group $sg31$.

Input EA of the AND gate in storage MPH1 may receive a d.c. current pulse across the contacts of non-locking push-button B1. The output of gate PE1 is connected to an input of OR gate PO1, of which the output is connected to the second input EB of the AND gate in MPH1. An output SA of said storage is connected to a relay TM1 through amplifier AP1, relay TM1 starting motion of machine M1 by energizing coil BEV1 of the electrovalve 53.

Output SA of storage MPH1 is connected to an input of AND gate PE2 in the next sub-group $sg12$.

Inputs EC of the OR circuits in MPH1, MPH2 . . . MPH6 are fed in parallel from one pole of the stabilized power supply AS across push-button CR controlling re-entry of the machines, said button being operated to reset all said storages.

The contacts of the movement control push-buttons B1 to B6 are also connected in parallel to the same pole of AS, the same applying to contacts $rs11$, $rs12$, . . . $rs16$, connected across the control switching contact at and contact au2. The second inputs of gates PO1, PO2, . . . PO6 are connected to the "single motion" side ST of the motion selector. Output SB of MPH2 is connected at input ED of MPH1, output SB of MPH3 (not shown) being connected back to input ED of MPH2, and so forth, output SB of MPH6 connecting back to input ED of MPH5.

Relays TM1, TM2 . . . TM6 are parts of amplifiers AM1, AM2, . . . AM6. Each has a MAKE contact $tm1$, $tm2$ . . . $tm6$ across which the coils of electrovalves BEV1, BEV2, . . . BEV6 of winding machines M1 to M6 are energized respectively. For example, sub-group $sg21$ includes contact $tm1$ and electrovalve coil BEV1.

The electromechanical circuits of sub-groups $sg31$ serving winding machine M1 include a start/stop switch I1 controlling winder motor MO1. The motor is powered by a circuit including the closed contacts of said switch, contact $sf1$ of a copper wire continuity tester, a MAKE contact $cp1$ of the turns preselection counter 39, contact $fc1$ and contact $fp1$, which are respectively an end-of-travel contact and a door-contact operated by the rear door of cabin C1. Wire continuity test contact $sf1$ is on the tensioning plate 35 (FIG. 4) ; contact $cp1$ of preselection counter 39 is closed by mounting a coil core 33 on the winding machine's spindle, the counter register displaying the selected number of turns to be wound on the core ; contact $fc1$ is situated at the rear of the cabin, and is closed when the rear of the machine base operates it on withdrawing completely into the cabin.

A motor brake microswitch (not shown) is delayed to ensure that its contact $cf1$ will be closed as long as the motor MO1 is receiving current, and that it will open after a set delay when power to the motor is cut-off; On coil completion, the preselection counter having counted down to 0 switches over contact $cp1$, to open the motor power circuit and close a circuit across contact $cf1$ for brief excitation of brake coil BF1. The brake coil BF1 is energized across $sf1$ if the wire breaks.

Relay RS1 shunts brake coil BF1, so that on coil completion or if the wire breaks, its contact $rs31$ will light lamp L1 on tablet T1.

On starting to operate the work-post, the general reset button CR is pressed by the operator: outputs SA of storages MPH1, MPH2, . . . MPH6, go to "0", and outputs SB of said storages go to "1".

SINGLE MACHINE MOTION

At start of work, none of the machines is loaded with a core, and all are in their cabins.

The operator sets selector AT for single machine motion, whereby contact at is switched to side ST, a "1" appearing at inputs EB of storages MPH1 to MPH6, through OR gates PO1 to PO6.

The operator then presses button B1, for example, which switches output SA of storage MPH1 to level "1", and operates relay TM1. Contact TM1 connects excitation to coil BEV1, which switches electrovalve 53 (FIG. 6), and brings machine M1 out of its cabin. The operator then mounts a core 33 between spindle 41 and tail stock 42 (FIG. 4) of the machine, attaches the end of the wire and gives it a few turns around the core by turning wheel 38. The next step for the operator is to press the re-entry control button CR, which cuts-off electrovalve excitation; the valve resets, and machine M1 retires into cabin C1. Next, the operator presses button B2 to start identical operations on machine M2, returning it to its cabin by operating CR again, and so forth.

As each machine retires fully into its cabin, end-of-travel contacts *fc* close the drive circuits of their respective motors MO. As coils are completed, the corresponding preselection counters successively open their contacts *cp* in the motor drive circuits and connect current to motor brake coils BF. Relays RS are operated in succession, and lamps L light up in succession, announcing coil completion by the machines to which they pertain.

DOUBLE SIMULTANEOUS MOTION

Let us assume that all machines have completed winding, and are all in their cabins after a full single motion cycle: relays RS1 to RS6 have all pulled in, and lamps L1 to L6 are ON.

Changeover contact at still being on ST (single motion), the operator advances any one machine, let us say M6, by pressing button B6 to switch output SA of MPH6 from "0" to "1", and output SB from "1" to "0". The operator then removes the completed coil from M6, and mounts a core.

Selector At is then operated to switch contact *at* to DT (double motion).

Output SA of MPH6 being "1" and contact *rs11* being closed, "1" appears at input EB of storage MPH1 through gates PE1 and PO1. The operator presses button B1, which switches output SA of MPH1 to "1" and advances machine M1 by operation of relay TM1. Output SB of MPH1 having switched to "0", this level appears at input ED of storage MPH6, which reverts to the initial condition SA = 0, SB = 1; Relay TM6 drops out and opens contact *tm6*, cutting off power to coil BEV6 of electrovalve 53, whereupon compressed air pressure is redirected to push back piston 52 in cylinder 46 (FIG. 6) and return machine M6 into its cabin. Withdrawal of M6 thus takes place at the same time as the advance of machine M1. The operator may now remove the completed coil from machine M1 and replace it with a core.

The "1" at SA of MPH1 is connected to input EB of MPH2 (contact *rs12* closed). The operator presses button B2: SA and SB of MPH2 go respectively to "1" and "0".

Relay TM2 picks up to trigger exitting of machine M2, while relay TM1 drops out to trigger withdrawal of machine M1 (ED of MPH1 being switched to "0" from SB of MPH2, MPH1 reverts to its initial state, namely SA = 0, SB = 1).

Operation is then repeated in this manner, output SA = 1 of MPH2 and closed contact *rs13* permitting switchover of MPH3 when B3 is pressed, and output SB = 0 of MPH3 switching MPH2 back to its initial state, and so forth.

An improvement of the winding machine facilitates the placing of wire spools 17 and reduces the height of this machine, and consequently that of the cabins in which they are accomodated.

Figure 9:
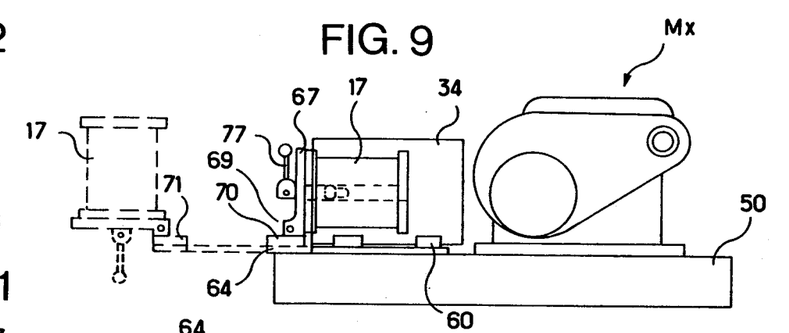
FIGS. 9, 10, 11 and 12, show an improvement of the feed spool device, whereby the sound damping cabinets can be reduced in height.
Figure 10:
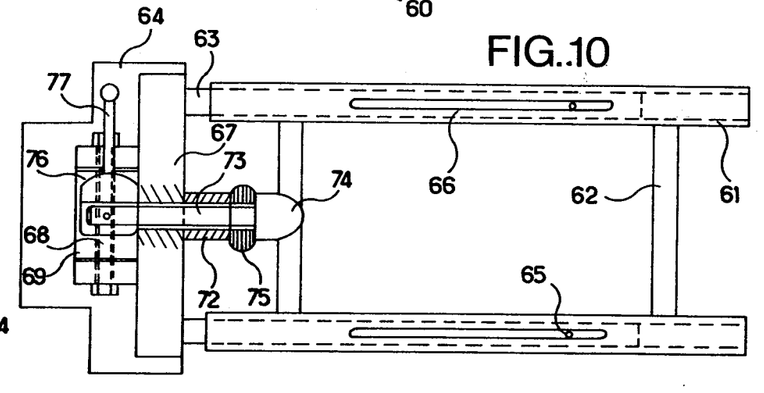
Figure 11:
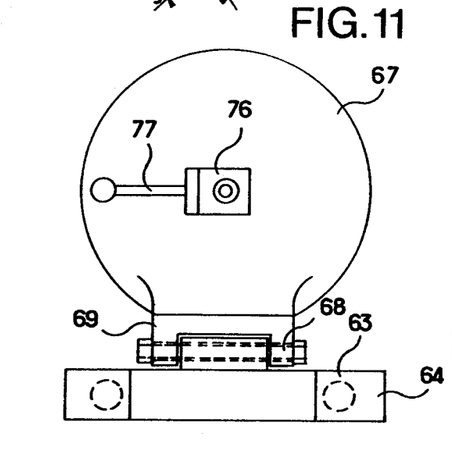

The arm 36 (FIGS. 4 and 5) is not fitted, and the spool 17 with its casing 34 is positioned horizontally on the base of the machine, as shown in FIG. 9. For this, casing 34 is fixed on feet 60 welded to a frame comprising two tubes 61 joined by struts 62, said frame being fixed to base 50.

Two rods 63 joined to a block 64 slide in tube 61, their travel in the tube being limited by a stud on each rod sliding in slot 66 in tubes 61.

Figure 12:
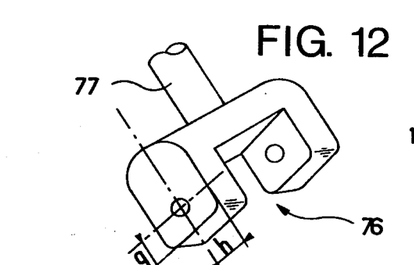

A circular plate 67 is free to pivot on shaft 68 fitted on a projection on block 64. Pivoting is rendered tangental to the plate by bracket 69 forming part of said plate and so shaped as to bear on face 70 of block 64 when the plate is horizontal, and on face 71 of said block, when the plate is tipped into its vertical position. The plate has a central opening and a metal bushing 72 of an inside diameter identical to that of the circular opening, said bush being welded to the top of the plate seen in its horizontal position, its inside diameter and the diameter of the opening coinciding. Plate 67 and bushing 72 are crossed by rod 73, which has a bullet-shaped head 74 and carries a rubber ring 75 between the base of the head and the bushing. Rod 73 emerges through the under-side of the plate, a pin in a hole through this end of the rod joining it to locking toggle 76, 77 : the holes provided in the toggle for the pin joining to rod 73 are so situated that dimension g is a few millimetres shorter than dimension h (FIG. 12).

The outside diameter of bushing 72 and head 74 is slightly less than the inside diameter of spool 17. The outside diameter of the rubber ring is the same as that of the bushing while the lever 77 is perpendicular to the plate 67. When lever 77 is placed parallel to the plate, part 76 pulls back rod 73, compressing the rubber ring 75 between the base of head 74 and bushing 72, thereby expanding the outside diameter of ring 75. This action holds the cheek of spool 17 against the plate 67, 17 having been slipped over head 74, rubber ring 75, and bushing 72.

When spool 17 is depleted by a series of relay coil (32) winding operations, the operator pulls out block 64 to remove spool 17 from casing 34, then tips plate 67 into the horizontal position, finally tipping toggle lever 77 perpendicular to the plate, to release the empty spool.

On replacement of the spool, operations are reversed in order and direction.

It is understood that without departing from the invention, certain details may be changed and certain facilities replaced by equivalents, without affecting the characteristics of the invention: for example, air cylinder 46 could be mounted laterally along one side of the machine base, and piston rod 52 fixed to the floor of the cabin.

Similarly, and as already stated, the air cushion suspension system could be replaced with rollers fixed to the bases of the machines and guided by rails. Finally, the invention applies equally well to any other type of machine requiring manual loading, such as machines for surface treatment, painting, and drying of components, in which case the machines would be simply supporting carriages.

What we claim is:

1. A work-post for semi-automatic machines comprising: multiple cabins, each accommodating one of said machines, and said work-post further including means for movement and guidance of the machines in advancement out of their cabins and return to them, means for opening and closing the cabins as the machines are respectively advanced and retracted, means for indicating that machines have completed their tasks, and means for control of the motion of said machines in and out of their cabins.

2. The work-post for semi-automatic machines according to claim 1, in which said means for machine movement comprises an air cylinder with a piston, and wherein the piston is connected to the base of the machine and the cylinder itself is fixed to the cabin.

3. The work-post according to claim 2, further including an air-cushion chamber means for supporting the means for moving each machine.

4. The work-post according to claim 2, wherein said machine movement means comprises one air-cylinder and one air-cushion chamber per machine, the cylinder and the chamber being associated by means of an electrovalve connected firstly to the two ends of the air-cylinder by pipes and secondly to the air-chamber by a third pipe, said electrovalve directing compressed air against the outer and inner face of the piston respectively through the first or second pipe according to whether the machine is to leave or enter its cabin, said first or second pipes receiving air expelled from the cylinder and connected through the electrovalve with the third pipe whereby the air expelled from the cylinder and directed into the air-cushion chamber for suspension of the machine during air-cylinder piston travel, and consequently during movement of said machine.

5. The work-post according to claim 4, wherein said means for guidance of the machines comprises the cabins being arranged in a semi-circle, with the tablets forming the platform supporting the machines when not in their cabins, said platform being divided into said tablets, separated by radial slots extending along the center-line of the cabin floors, said slots functioning as guide rails for the machines, and said machines having bases equipped along their center-lines with two rollers which travel in said slots.

6. The work-post according to claim 1, further comprising means for obtaining respectively the opening and closing of the cabin doors when the machines are driven out or returned, said obtaining means comprising, for each cabin a double door opening outwards therefrom and being fitted to cabin uprights by hinges equipped with return-springs.

7. A work-post according to claim 6, in which the inner surfaces of the double doors and the inner surfaces of the cabin panels are covered with an acoustically isolating lining to abate the externally perceivable noise of the machines operating in said cabins.

8. A work-post according to claim 6, in which the bases of said machines are laterally equipped with pairs of rails which curve inwards in front of the bases, so as to push open the double doors as machines are driven outwards, and which also keep said double doors open while the machine is on its supporting tablet of the platform.

9. A work-post according to claim 1, wherein the means for the control of machine motion out of and into cabins comprises a first group of electronic circuits connected in parallel to a stepped-down and rectified mains input supply, and a second group of electromechanical circuits, connected in parallel to the mains input, each of said groups comprising $n$ sub-groups serving $n$ machines, on the basis of one sub-group per machine.

10. The work-post according to claim 9, wherein said control means further comprises a first group of electronic circuits, each sub-group in said group comprising storage consisting in the association of a two-input AND gate with a two input OR gate and a two-output flip-flop, whereby said storage is in turn associated with an AND and an OR gate in series, said OR gate driving input of the AND circuit comprised in the storage, of which the output is connected firstly to a relay controlling operation of an electrovalve pertaining to said sub-group, and secondly to an input of the AND gate pertaining to the next following sub-group, the other input of said AND gate being connected to receive an electrical pulse across the contacts of a non-locking machine movement starting control button, and across a contact of a movement selector in a first position, referred to as "single movement" position, whereby pressing the starting control button connects a pulse to the storage through one of the OR gates only, with the simultaneous operation of the relay, which by means of a contact energizes said electrovalve to drive the machine out of its cabin.

11. A work-post according to claim 9, comprising a second group of electromechanical circuits composed of $n$ sub-groups serving $n$ machines on the basis of one sub-group per machine, each of said sub-groups comprising, firstly a contact of an electrovalve control relay, said relay pertaining to a sub-group of the same order in the first group and secondly, an electrovalve actuator coil serving the machine of the same order.

12. A work-post according to claim 1, in which the rear of each cabin has a single-leaf door for access to the contained machine.

13. A work-post according to claim 1, further comprising means for the announcement of completion of machine jobs co-operating with means to turn a power supply to the machine on completion.

14. A work-post according to claim 13, wherein the machines are coil winding machines and the means for announcing the completion of a machine job comprises a preselection counter with display register for selection of the number of turns of wire to be wound on cores of electromagnetic relays, said counter operating a contact when the required number of turns has been wound on the core by the machine.

15. The work-post according to claim 13, wherein the means to turn off the supply also comprises means for operating a brake.

16. The work-post according to claim 1, wherein the cabins are placed side by side with their floors above floor level and moreover extended outwards from the fronts of the cabins in tablets to form a platform, said platform serving as a support for the machines when advanced out of their cabins.

17. A work-post according to claim 9, wherein said sub-groups of the first group (G1) of circuits each have an input of an AND gate (PE) connected to a second position (DT) constituting a double motion position, of the contact DT and of the selection button via a contact ($rs$) of the completion of winding supervision button, a second output (SB) of the element of each sub-group of given order being connected to an input (ED) of the OR circuit of the storage of the sub-group of previous order, so that the pressing of the movement control button (B) of a given sub-group simultaneously advances the machine controlled by means of said sub-group out of its cabin and the entry into the cabin of the machine controlled by means of the storage of the sub-group of preceding order.

* * * * *